June 5, 1934.  W. DE BACK  1,961,478
SIZING APPARATUS
Filed April 2, 1931  2 Sheets-Sheet 1
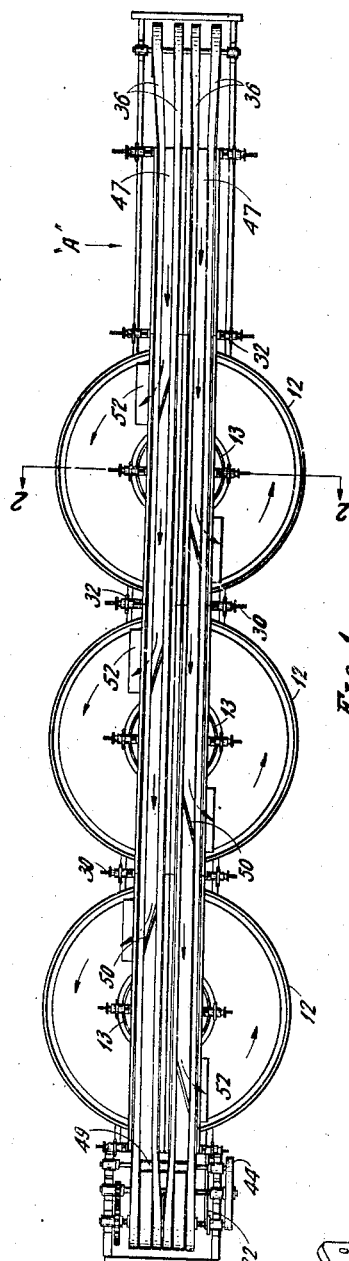
Fig. 1
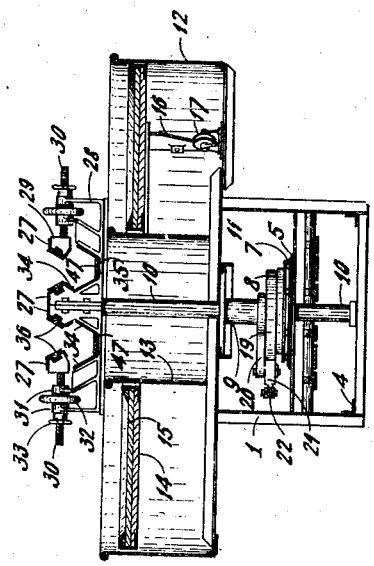
Fig. 2
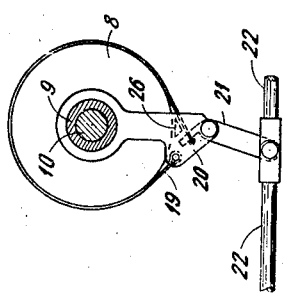
Fig. 5
Fig. 6
INVENTOR.
William de Back.
BY Philip A. Minnis
ATTORNEY June 5, 1934.  W. DE BACK  1,961,478
SIZING APPARATUS
Filed April 2, 1931   2 Sheets-Sheet 2
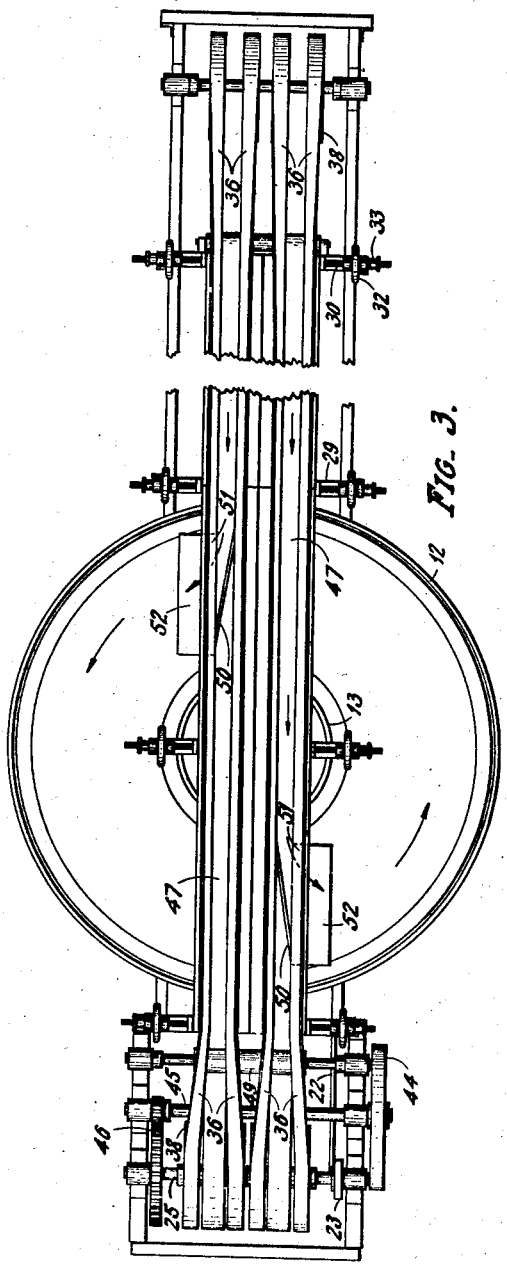
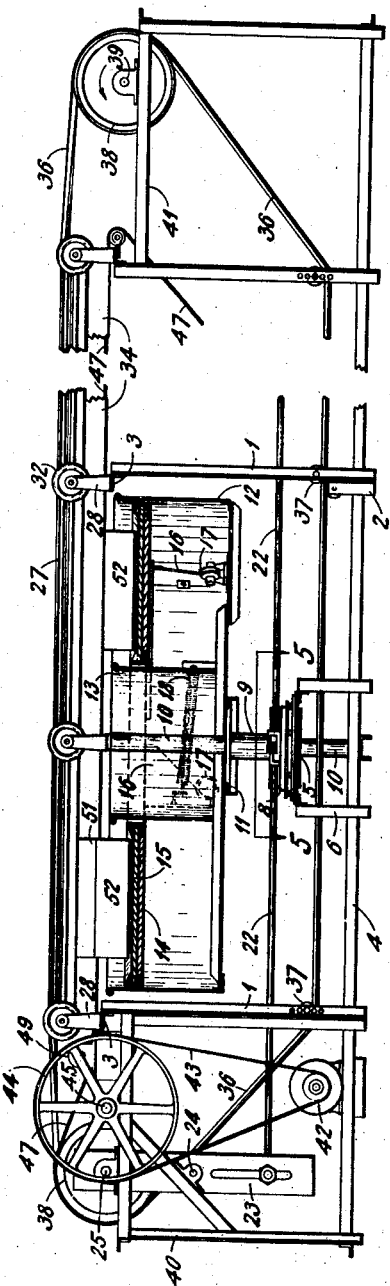
INVENTOR.
William de Back.
BY Philip A. Minnis
ATTORNEY.

Patented June 5, 1934

1,961,478

UNITED STATES PATENT OFFICE 1,961,478

SIZING APPARATUS

William de Back, San Jose, Calif., assignor to Food Machinery Corporation, San Jose, Calif., a corporation of Delaware Application April 2, 1931, Serial No. 527,125

7 Claims. (Cl. 209—74)

This invention relates to the art of grading fruits, vegetables or the like, and has particular reference to an apparatus for separating the fruit into groups according to size.

In such machines it has heretofore been the custom to provide a series of rectangular bins disposed underneath and to one side of the sizing means to receive the fruit as it is discharged therefrom. The bins are usually placed end to end so that the packers can work along one side only, and sloping bottoms are provided to cause the fruit to roll outwardly to a point within reach of the packers.

It has been found that in running a quantity of fruit through the machine, the proportions delivered to the several bins will vary from time to time, as one size or another preponderates. Due to the necessity of conserving space the bins are necessarily of such size that only a limited number of packers can work alongside, and by reason of these limitations, when a bin receives fruit more rapidly than the packers at that bin can take care of it, there is no available room to accommodate extra packers, and the machine must either be slowed down to a speed such that the packers can keep up with it, or it must be shut down from time to time to allow them to catch up.

A further difficulty encountered in the operation of this type of machine is the lowered efficiency of the packers by reason of interference with each other and the resulting confusion in their efforts to select fruit of the proper shapes and sizes to fill the boxes in the desired manner. This is due to the fact that since the fruit is released from the sizing means across the entire width of the bins, the fruit in each bin is not all of exactly the same size, but varies between certain limits. These sizes are graduated from one side of the bin to the other, so that all the smaller fruit is at one side while all the larger fruit is at the opposite side, with the intermediate sizes in between. The packers are thus forced to move about from one side of the bin to the other in order to select the proper sizes and shapes for packing.

These difficulties are overcome in an apparatus embodying my invention, wherein I dispense with the ordinary rectangular bins and use instead a series of circular bins over the center of which is disposed the sizing means. I also construct these bins either so that they can be rotated as a whole, or their bottoms can be rotated. In this manner I am enabled to greatly increase the space available for packers, with little or no increase in the amount of floor space necessary for the apparatus. Moreover, since the bins rotate, a varied selection of fruit is constantly passed before each packer so that they have no difficulty in finding the proper shapes and sizes for packing.

In the construction of an apparatus such as just described I have also utilized certain structural innovations which result in unusually sturdy and compact construction, and readily permit an increase in capacity when desired. Such construction and advantages will become more apparent as the description advances.

It is, therefore, the general object of this invention to construct a fruit sizing apparatus which shall be simple, compact and sturdy in design, and which shall have a large capacity, occupy a relatively small amount of floor space, and readily permit of an increase in capacity when desired.

Another object is to provide in a sizing apparatus a series of rotatable bins for receiving fruit released from the sizing means and passing it before the packers, whereby the space available for packers is greatly increased and their work simplified.

With such objects in view, as well as other objects and advantages which will become more apparent as the description proceeds, the invention resides in the various arrangements and combinations of elements hereinafter set forth and claimed, it being understood that various changes and modifications may be resorted to without departing from the spirit and scope of the invention as set forth in the claims hereto appended.

In the accompanying drawings, in which like parts are designated by like reference characters throughout the several views:

Figure 1 is a plan view of an assembled sizing apparatus embodying my invention.

Figure 2 is a sectional view taken along the line 2—2 of Figure 1, and drawn to a somewhat larger scale.

Figure 3 is a large scale plan view of a portion of the apparatus shown in Figure 1, illustrating in detail one of the packing units together with the driving means therefor.

Figure 4 is a side elevation of the apparatus illustrated in Figure 3, the packing bin being shown in section.

Figure 5 is a sectional view drawn to an enlarged scale taken along the line 5—5 of Figure 4 and illustrating the driving means for rotating the packing bin.

Figure 6 is a perspective view of one section of a split bearing socket for use when only one set of sizing elements is used.

I have chosen to illustrate my invention as an apparatus made up of three packing units, each including a rotary packing bin adapted to receive fruit from a corresponding section of sizing means, but as will be seen, any number of units may be utilized according to requirements. Since the units are of identical construction, the description of one will suffice for all.

As best illustrated in Figures 2, 3, and 4, each packing unit includes a frame having the corner supporting members 1 at one end, and the shorter corner supporting members 2 at the other, being held in place by the transverse members 3 and longitudinal stringer members 4. Located centrally of the frame is a pedestal 5 supported by legs 6 and provided with a raceway for the anti-friction bearings 7 upon which rests the rotatable hub 8. The hub 8 is provided with an upwardly projecting sleeve or bearing 9 through which passes the stationary vertical shaft 10, about which the hub is adapted to rotate. The top end of the bearing 9 supports a seat 11, upon which rests a circular bin having an outer peripheral wall 12, an inner concentric wall 13, and a bottom 14, which is preferably padded as at 15 in order to minimize danger of bruising the fruit.

In order to insure that the contents of the bin will not overflow in case fruit is deposited therein faster than it is removed, and also for the purpose of presenting the surface of the fruit at a constant level, the bottom 14 is vertically yieldable. This is accomplished by securing to its underside a plurality of curved wedges 16 which are adapted to rest upon corresponding grooved rollers 17 carried on the inner side of the wall 12. So that the inclined portion of the wedges may properly cooperate with the grooves in the rollers 17 they are of curved configuration, as shown. Springs 18 are secured to the inner side of the wall 12 and have their opposite ends attached to the wedges 16 and thus serve to urge the bottom 14 upwardly. By this construction of the bin bottom it will be seen that as the fruit accumulates thereon it will descend correspondingly and will not tip regardless of inequalities of distribution of fruit upon its top surface.

The driving mechanism for rotating the bin includes a friction band 19 encircling the hub 9 and attached at one end to the outer portion of an arm 20 loosely journaled at its inner end on the bearing 9. The opposite end of the band 19 is attached to one end of a bell crank 21, pivoted to the underside of the arm 20. The bell crank is oscillated by means of one of the rods 22. The bell cranks associated with the several packing units are connected together by these rods 22, which cause the packing bins to be operated in unison. The rod at the driving end of the apparatus is actuated by a walking beam 23, pivoted at 24, and driven by an eccentric portion of the shaft 25. It will be seen that as the rod 22 is urged to the right, the shifting of the bell crank 21 will tighten the band 19 about the hub 8 until the friction causes the hub to rotate, thus rotating the bearing 9 and the entire bin structure supported thereon. Since the bins are interconnected by the several rods 22, they are all caused to rotate simultaneously. When the rods start on their return movement towards the left, the band 19 is loosened so that it merely slips on the hub without sufficient friction to turn it. A stop 26 is provided for engagement with the inner end of the bell crank 21 to limit its movement and cause the return of the arm 20 to its original position. As the rods 22 are reciprocated the bins are slowly rotated step by step by reason of the successive impulses and thus slowly carry the fruit in the bins before the packers. This construction readily permits the sectional construction of the apparatus and has the further advantage that the packers can, if desired, prevent rotation of the bin.

Each packing unit may carry either one or two sections of supporting and guiding means for the sizing elements according to the capacity desired. In the illustrations I have shown the apparatus equipped with two sets of sizing elements arranged in parallel side by side relation. The guides for each set of sizing elements comprise a pair of longitudinally arranged sheet metal strips 27 carried upon brackets 28, the inner guide being stationary and fixed to the brackets, while the outer one is supported by an adjustable mounting whereby it can be moved relative to the inner guide so as to vary the distance between them. Each bracket is provided with one of these adjustable mountings, which includes a support 29 mounted on the end of a screw 30 which passes through bearings 31 provided in upstanding portions of the bracket. The bearings are smooth bored, but the handwheel 32 is threaded, whereby rotation thereof will cause axial movement of the screw. A locknut 33 serves to lock the screw in any desired position.

The brackets 28 in each unit also carry a section of troughing, having side walls 34 and a bottom 35, which trough receives the fruit as it falls from the sizing elements above.

Each pair of guides is carried upon two of the brackets 28 in each packing unit, one of the brackets being carried upon a cross member 3 at one end of the unit in such position as to form a support for the ends of the guides of the corresponding unit as well as the ends of the guides of an adjacent unit; and the other bracket is carried upon an extension of the vertical shaft 10. For this purpose, and for the sake of interchangeability, each bracket has integrally formed on its inner end a half section of a split bearing socket 34, adapted to fit over the upper end of the shaft 10. When two sets of sizing elements are used, as shown, this section of the socket cooperates with the similar section on the corresponding bracket for the adjacent sizing elements to encase the upper end of the shaft 10, so that when the two sections are bolted together the brackets are solidly supported by the shaft 10. Where only one set of sizing elements is used, a section of split bearing 35, such as illustrated in Figure 6, may be bolted to the section 34 to complete the socket support.

The above described arrangement affords a solid and sturdy support for the sizing elements and includes a minimum of supporting structure occupying a relatively small amount of space. Vibration is also reduced to a very small amount.

As may be seen, any number of packing units may be placed in end to end relation so as to give the desired capacity, and when so positioned, the sections of guiding strips 27 and the troughs thereunder carried by each unit are in alignment and form a continuous guide for the sizing elements substantially the entire length of the apparatus.

The sizing or grading elements consist, in the embodiment illustrated, of two pairs of longitudinally divergent endless moving belts 36 having their working faces angularly disposed so as to form open bottomed troughs, as best illustrated in Figure 2. These belts are T shaped and their upper reaches are supported by and operated in the metal guides 27. The lower reaches of the belts pass beneath tensioning rollers 37, supported by the corner members 1 of the packing unit frames. The belts pass around pulleys 38 carried on shafts 25 and 39 supported by suitable frames 40 and 41 at each end of the apparatus, and may be driven by any suitable means. In the construction shown, the pulleys 38 at one end of the machine are mounted on the shaft 25, which is driven from the electric motor 42 through the medium of the belt 43, pulley 44, shaft 45, and gears 46.

It will be understood that in practice the guides 27 are set in such position that the belts 36 diverge from one end of the machine to the other, and in order to catch the fruit which falls between the sizing belts and deposit it with its proper group there are provided the endless carrier belts 47, mounted directly under the openings between the sizing belts and operating in the trough bottoms 35. These carrier belts are operated by pulleys similar to pulleys 38, and their lower reaches pass beneath the rollers 37. A roller 49 serves to maintain the upper reaches of the carrier belts in the proper horizontal plane. Deflecting members 50 are disposed above the carrier belts and serve to divert the fruit from the belts through the openings 51 in the trough walls 34 and into the packing bins. When two sets of sizing elements are used these points of discharge are preferably located at opposite sides to the bins. Suitable ramps 52 may be provided to insure gentle transfer of the fruit from the carrier belts to the bins and these may be formed of flexible material if desired.

It is believed that the construction and operation will now be apparent. Where usual capacity is desired several of the packing units may be connected together and a single set of sizing elements used. When an increase in capacity is desired this may readily be accomplished by adding the second set of sizing elements or by adding extra packing units, or both as the occasion requires. The fruit is deposited upon the sizing elements at A, and is carried thereby until the divergence of the belts allows it to drop through onto the carrier belts 47, from which it is deflected by the members 50 into the several packing bins. Since the packers may be positioned around substantially the entire circumference of the bins, an unusually large number of packers can work at the bins in which the fruit is constantly passed before them so that a variable selection of fruit is available for each packer. The inner concentric walls 13 provided in the bins serve to keep the fruit within reach of the packers at all times. A sizing apparatus is thus provided having a relatively large capacity as compared with the floor space occupied, and which promotes the efficiency of the packers and permits of ready increase of capacity when desired.

Having now described my invention, and in what manner the same may be used, what I claim as new and desire to protect by Letters Patent is:

1. In a sectional sizing apparatus, a plurality of packing units, each packing unit including a separate frame, a rotary circular bin, a vertical bearing shaft rotatably supporting the bin and extending thereabove, a bracket mounted on said shaft, a sizing element guide extending across the bin and carried by said bracket, and a bracket on said frame to one side of the bin, each of said last mentioned brackets being arranged to support contiguous ends of the sizing element guides of adjacent packing units.

2. An apparatus of the character described, comprising a pair of grading devices for grading articles according to size, means for driving said grading devices, and a plurality of rotatable circular packing bins arranged in a row directly beneath said grading devices to receive the several discharges of graded articles therefrom, each grading device extending above and longitudinally of the row of packing bins and arranged to discharge graded articles to each bin at a point substantially diametrically opposite to the discharge of the other grading device to said bin.

3. An apparatus of the character described, comprising a pair of grading devices for grading articles according to size, means for driving said grading devices, and a plurality of rotatable circular packing bins arranged in a row directly beneath said grading devices to receive the several discharges of graded articles therefrom, said grading devices extending above and longitudinally of the row of bins on opposite sides of the centers thereof and each grading device being arranged to discharge graded articles to each bin at a point substantially diametrically opposite to the discharge of the other grading device to said bin.

4. An apparatus of the character described, comprising a pair of grading devices for grading articles according to size, each grading device including a sizing mechanism and codirectional means therebeneath for receiving sized articles therefrom and discharging the several sizes at separate points of discharge, means for driving said grading devices, and a plurality of rotatable circular packing bins arranged in a row directly beneath said grading devices to receive the several discharges of graded articles therefrom, said grading devices extending above and longitudinally of the row of packing bins on opposite sides of the centers thereof.

5. An apparatus of the character described comprising a pair of grading devices for grading articles according to size, each grading device including a sizing mechanism and codirectional means therebeneath for receiving sized articles therefrom and discharging the several sizes at separate points of discharge, means for driving said grading devices, and a plurality of rotatable circular packing bins arranged in a row directly beneath said grading devices to receive the several discharges of graded articles therefrom, said grading devices extending above and longitudinally of the row of packing bins on opposite sides of the centers thereof, and having their discharge points in staggered relation with respect to each other whereby each grading device discharges graded articles to each bin at a point substantially diametrically opposite to the discharge of the other grading device to said bin.

6. A sectional sizing apparatus comprising a plurality of packing units, each packing unit including a separate frame, a rotatable circular packing bin, a vertical bearing shaft projecting centrally through the bin for rotatably supporting the same, a bracket mounted upon the upper portion of said shaft above the bin, a sizing element guide extending across the bin, means associated with said bracket for supporting said guide and including adjustable means for varying the position of the guide, a cross member on said frame to one side of the bin, a second bracket mounted on said cross member, each of said last mentioned brackets being arranged to support contiguous ends of the sizing element guides of adjacent packing units, and adjustable means associated with said last named brackets for varying the position of said guide.

7. An apparatus of the character described, comprising a grading device including a longitudinally movable sizing element, means for driving said sizing element, a rotatable circular bin beneath the grading device for receiving graded articles therefrom, a vertical bearing shaft projecting centrally through the bin for rotatably supporting the same, a guide for said sizing element extending across the bin, a supporting bracket for said guide, means for securing said bracket to the upper portion of said shaft above the bin, and means to the side of the bin for supporting the outer end of said guide.

WILLIAM DE BACK.